United States Patent [19]

Sandreid

[11] Patent Number: 5,083,350
[45] Date of Patent: Jan. 28, 1992

[54] ROPE GRIPPING DEVICE

[75] Inventor: Alf J. Sandreid, Copenhagen, Denmark

[73] Assignee: Sophus Berendsen Marine A/S, Copenhagen, Denmark

[21] Appl. No.: 598,069

[22] Filed: Oct. 16, 1990

[30] Foreign Application Priority Data

Oct. 20, 1989 [DK] Denmark .................... 5234/89

[51] Int. Cl.⁵ .................... F16G 11/00; B63B 21/00
[52] U.S. Cl. .................... 24/134 R; 24/134 N; 24/68 CD; 254/251
[58] Field of Search ............ 24/134 R, 134 L, 132 R, 24/132 WL, 68 CD, 134 N; 188/65.1; 254/250, 251, 256

[56] References Cited

U.S. PATENT DOCUMENTS

| 3,437,981 | 4/1969 | Keller ................ 24/134 R |
| 3,686,715 | 8/1972 | Brodnicki ............ 24/68 CD |
| 3,824,653 | 7/1974 | Sholler .............. 254/251 |
| 3,979,797 | 9/1976 | Stember .............. 24/134 R |
| 4,438,659 | 3/1984 | Desplats ............. 188/65.1 |
| 4,465,011 | 8/1984 | Merry ................ 24/134 R |
| 4,669,582 | 6/1987 | Sandried . |
| 4,912,817 | 4/1990 | Sandreid . |

FOREIGN PATENT DOCUMENTS 1280920 7/1972 United Kingdom ............ 24/132 R

Primary Examiner—Victor N. Sakran
Attorney, Agent, or Firm—Dennison, Meserole, Pollack & Scheiner

[57] ABSTRACT

A gripping device for releasably gripping a rope-like member comprises a pair of rope-engaging members defining a pair of opposite, mutually spaced rope engaging surfaces defining a rope passageway therebetween. The rope engaging surfaces are mounted in a frame so as to be moveable in relation to each other such that a force applied to the rope engaging surfaces and acting in one direction of the rope passageway will tend to move the rope engaging members closer to each other towards a locking position, while a force applied to the rope engaging surfaces and acting in the opposite direction of the rope passageway will tend to increase the spacing of the rope engaging surfaces and to move the rope engaging members towards a releasing position. At least one of the rope engaging members is connected to an operating handle by means of a lost motion connection. When the operating handle is moved from an inactive position to an active position the rope engaging members are moved to their releasing position. A releasable retaining member is connected to said at least one rope engaging member and is adapted to retain the rope engaging member in relation to the frame in said releasing position. The operating handle may then be moved back into its inactive position, while the rope engaging members are retained in their releasing position. When it is desired to lock or grip the rope the retaining means may be released.

10 Claims, 1 Drawing Sheet

1

ROPE GRIPPING DEVICE

BACKGROUND OF THE INVENTION

1. Field of the Invention

The invention relates to a gripping device for releasably gripping a rope-like member, such as a rope, a cord, a wire, or a similar elongated, flexible member, said device comprising a frame, a pair of spaced rope engaging members having a pair of oppositely arranged, generally parallel extending rope engaging surfaces defining therebetween a passageway for the rope-like member and being mounted in said frame so as to be moveable in relation to each other such that a force applied to said rope engaging surfaces and acting in one direction of said rope passageway will tend to move the rope engaging members closer to each other towards a locking position of the engaging members, while a force applied to the rope engaging surfaces and acting in the opposite direction of the rope passageway will tend to increase the spacing of the rope engaging surfaces and to move the rope engaging members towards a releasing position, an operating handle mounted in the frame so as to be swingable between inactive and active positions, and lost motion connecting means interconnecting the operating handle and at least one of the rope engaging members such that the rope engaging members are moved to their releasing position when the operating handle is moved from its inactive to its active position.

2. Description of the Prior Art

Gripping devices of the above type are disclosed in U.S. Pat. Nos. 4,669,582 and 4,912,817 and may, for example, be used on sailing ships and in other places, where it is desirable to releasably grip and hold a tensioned rope or wire. As an example a gripping device of the above type may be used in connecting with winches, tackles, and other rope pulling devices which may, for example, be used for hauling in sails.

When the operating handle of such a gripping device is in its inactive position, a rope or cord arranged between the rope engaging surfaces may be moved along the passageway in said opposite direction while movement of the rope in said one direction causes gripping and locking of the rope by the rope engaging members. When the operating handle of the gripping device is moved from its inactive to its active position the rope engaging surfaces of the locking device will be forced away from each other so that the rope or cord may be moved freely along the rope passageway in both directions. In its inactive position, the operating handle is conveniently totally or partly arranged within the limits or contours of the frame so that persons passing by cannot inadvertently actuate the operating handle in this position. However, in the active position of the operating handle in which the rope engaging members are retained in their rope releasing position, the operating handle is extending beyond of the frame of the gripping device. When the gripping device is mounted on the deck of a sailing ship or at other frequented places, the extending free end of the operating handle may inadvertently be actuated and moved from its active to its inactive position, whereby the rope is suddenly and inadvertently gripped or locked.

SUMMARY OF THE INVENTION

These problems may be eliminated by the present invention which provides a gripping device for releasably gripping a rope-like member and comprising a frame, a pair of spaced rope engaging members having a pair of oppositely arranged, generally parallel extending rope engaging surfaces defining therebetween a passageway for the rope-like member and being mounted in said frame so as to be moveable in relation to each other such that a force applied to said rope engaging surfaces and acting in one direction of said rope passageway will tend to move the rope engaging members closer to each other towards a locking position of the engaging members, while a force applied to the rope engaging surfaces and acting in the opposite direction of the rope passageway will tend to increase the spacing of the rope engaging surfaces and to move the rope engaging members towards a releasing position, an operating handle mounted in the frame so as to be swingable between inactive and active positions, lost motion connecting means interconnecting the operating handle and at least one of the rope engaging members such that the rope engaging members are moved to their releasing position when the operating handle is moved from its inactive to its active position, and releasable retaining means connected to said at least one engaging member for retaining said engaging member in its releasing position in relation to the frame. When the operating handle of the gripping device is swung from its inactive position to its active position so as to move the rope engaging members away from each other to a rope releasing position, the said at least one engaging member may be retained in this position by the retaining means and thereafter, the operating handle may be moved back to its inactive position in which there is no risk of inadvertent actuation of the operating handle.

When it is desired to grip or lock the rope this may be obtained by releasing the retaining means, whereafter the rope engaging members may be moved back to a position in which they are in engagement with the rope or cord, for example under the influence of biasing means or spring means. The gripping device according to the invention renders it possible to move the rope engaging surfaces into engagement with the rope or cord quickly and efficiently, because after release of the retaining means a force may be applied thereto so as to force the rope engaging members towards their rope engaging position. Thus, the retaining means render it possible to obtain an especially efficient gripping effect corresponding to that obtainable by means of the gripping device disclosed in the above U.S. Pat. No. 4,912,817.

In principle, the retaining means may be of any kind by means of which the moveable rope engaging member or members may be retained in their rope releasing position. In a simple embodiment, the retaining means may define an abutment surface which may be moved into and out of engagement with a retaining surface defined in the frame. These cooperating surfaces may have a substantially complementary shape. As an example, one of the surfaces may have a convex shape, and the other surface may have a corresponding concave shape so that the two surfaces cannot be moved out of mutual engagement unintentionally.

In a preferred embodiment, the retaining means is swingably mounted or resiliently flexible such that the abutment surface may be moved to a position opposite to the retaining surface when the rope engaging members are in their releasing positions.

Such movement of the abutment surface may preferably be obtained by spring means so that the bias of such spring means should be overcome in order to release the retaining means. The retaining means may in itself be elastically flexible whereby the desired resilient bias may be obtained. As an example, the retaining means may be formed as a leaf spring defining an abutment surface at its free end.

The said at least one rope engaging member may be moveably mounted in the frame by means of swingable arms to which said rope engaging member is pivotally connected by means of transversely extending pins or pivots, the retaining means being connected to one of these pins or pivots. Thus, the gripping device according to the invention may be of the type disclosed in U.S. Pat. No. 4,669,582, and this known gripping device may then easily be modified and brought into agreement with the present invention by mounting a retaining means as that explained above. The retaining means may, for example, be a U-shaped wire member having a free end forming or being provided an activating member which may define the abutment surface.

When said at least one rope engaging member is moved from its rope engaging to its rope releasing position by means of the operating handle, the force which must be applied to the rope engaging member by the operating handle is much higher during the initial movement of the rope engaging member out engagement with the rope or cord than during the subsequent movement towards the rope releasing position. Therefore, the operating handle is preferably connected to said one rope engaging member by means of a link connection formed so as to decrease the ratio of movement between the swinging movement of the operating handle and the movement of the engaging member when the handle is moved towards its active position. This means that only a relatively small manual force should be applied to the operating handle in order to move the rope engaging member or members out of engagement with the rope or cord. However, during the subsequent swinging movement of the operating handle, the ratio of movement of the link connection will decrease so that the rope engaging members are moved away from each other to their rope releasing positions relatively quickly.

Such decreasing ratio of movement may be obtained in a simple manner thereby that the link connection may comprise a link swingably connected to the operating handle at a position spaced from the pivot axis of the operating handle, and the gripping device may further comprise a stop member for preventing said connecting link from swingably moving in relation to the operating handle during the last part of the movement of the operating handle towards its active position.

Such stop member may in principle be of any suitable type. In a preferred embodiment, however, the stop member defines an abutment surface formed on the operating handle for engaging with the connecting link. This means that while during the first part of the swinging movement of the operating handle from its inactive to its active position, the connecting link may be rotated in relation to the operating handle during the later part of the swinging movement of the operating handle, the connecting link is forced to move as if it was an integrating part of the operating handle. Alternatively, the stop member may be a pivot pin for swingably mounting the operating handle.

BRIEF DESCRIPTION OF THE DRAWING

The invention will now be further described with reference to the drawings, wherein.

DESCRIPTION OF THE PREFERRED EMBODIMENTS

Figure 1:
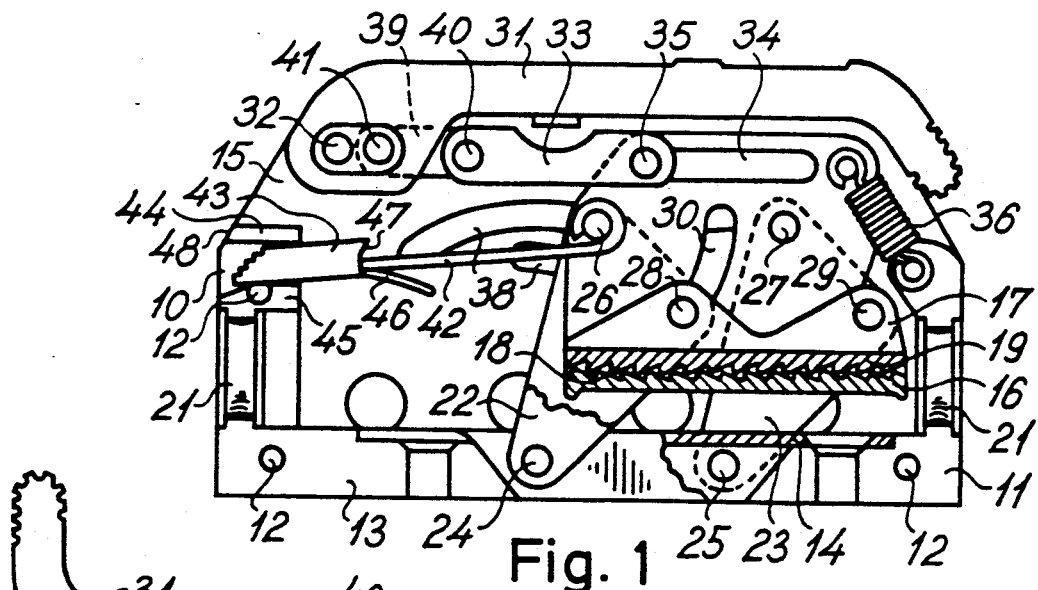
FIG. 1 is a side view of an embodiment of a gripping device according to the invention, one of the frame side plates having been removed.

The locking or gripping device shown in the drawing comprises a frame 10 having a substantially U-shaped cross-section and being divided into a pair of similar frame parts 11 along a symmetry plane of the gripping device. The frame parts 11 are interconnected by means of screws or similar fastening means (not shown) passed through bores 12. In the drawings one of the frame parts 11 has been removed for illustrative purposes. The frame parts 11 may be made from metal or be injection moulded from plastic, and in the latter case, a reinforcing member 14 made from metal may be arranged in a bottom wall 13 of the frame 10 and clamped between the frame parts 11. The reinforcing member 14 may, for example, have an inverted U-shaped cross-section.

A pair of rope or wire engaging members or jaw members 16 and 17 are mounted in the U-shaped frame 10 between oppositely arranged spaced side walls 15 thereof. One of the jaw members 16 has a U-shaped cross-section and is preferably may from plate metal. The upper side of the bottom wall of the jaw member 16 defines a substantially plane, roughened rope engaging surface 18. The other rope engaging member or jaw member 17 also has a U-shaped cross-section and is received within the U-shaped member 16. A second, substantially plane, but roughened rope-engaging surface 19 is defined by the jaw member 17, and the rope engaging surfaces 18 and 19 are arranged oppositely so as to define a rope passageway therebetween. A rope, a cord, or wire 20 to be gripped and locked by the locking device may be passed through a pair of guide rings 21, which are mounted in the frame 10, and between the opposite rope engaging surfaces 18 and 19. The rope engaging members or jaw members 16 and 17 are swingably mounted in relation to the frame 10 by means of a pair of substantially triangular swinging links or arms 22 and 23, each of which is swingably mounted about pivot pins 24 and 25, respectively, in the bottom wall 13 of the frame 10. The two pairs of swinging links or arms 22 and 23 are arranged at the outer side surfaces of the U-shaped rope engaging member or jaw member 16, and they are pivotally fastened to the upwardly extending side walls or flanges of this jaw member by means of pivot pins 26 and 27, respectively. The same swing links or arms 22 and 23 are pivotally connected to the engaging member or jaw member 17 by means of pivot pins 28 and 29, and the pivot pin 28 extends through cut-outs or openings 30 formed in the upwardly extending side walls or flanges of the jaw member 16. Arcuate channels 38 are formed in the side walls 15 at the inner surfaces thereof, and the ends of the pivot pins 26–29 are received in and move along these channels during movements of the swinging arms or links 22 and 23.

An operating handle 31 is swingably mounted between the side walls 15 of the frame 10 by means of a pivot pin 32, and the operating handle 31 is connected to U-shaped jaw member 16 by means of a connecting link 33 and an arm 39 pivotally connected thereto. A transversely extending stud or pin 35 fastened to one end of the connecting link 33 is engaging with slots or cut-outs 34 formed in the flanges of the jaw member 16 so as to form a lost motion connection. The lost motion connection formed by the slot 34 and the stud 35 permits the operating handle 31 to be placed in the position shown in solid lines in FIGS. 1 and 3 without preventing the desired movements of the rope engaging members or jaw members 16 and 17. The arm 39 is connected to the connecting link 33 by means of a pivot pin 40 and to the operating handle 31 by means of a pivot pin 41, which is spaced from the pivot pin 32 swingably mounting the operating handle 31.

A retaining member 42 in the form of a U-shaped wire member is swingably connected to the pivot pin 26, and an actuating member 43, which may, for example, be an injection moulded plastic member, is mounted at the free end of the retaining member 42. This free end of the retaining member extends outwardly through a passage defined in the frame 10 between upper and lower wall parts 44 and 45, respectively, formed on one of the side walls 15. A barb-like spring member 46 and an abutment surface 47 defining an acute angle with the longitudinal direction of the retaining member 42, are formed on the actuating member 43. When the retaining member 42 is moved in an outward direction between the wall parts 44 and 45, the spring member 46 will cooperate with the lower wall part 45 so as to apply an upwardly directed biasing force to the retaining member 42. This means that the retaining member 42 is swung upwardly when the actuating member has passed the upper wall part 44, whereby the abutment surface 47 is moved into engagement with an outer inclined surface 48 defined by the wall part 44.

Figure 2:
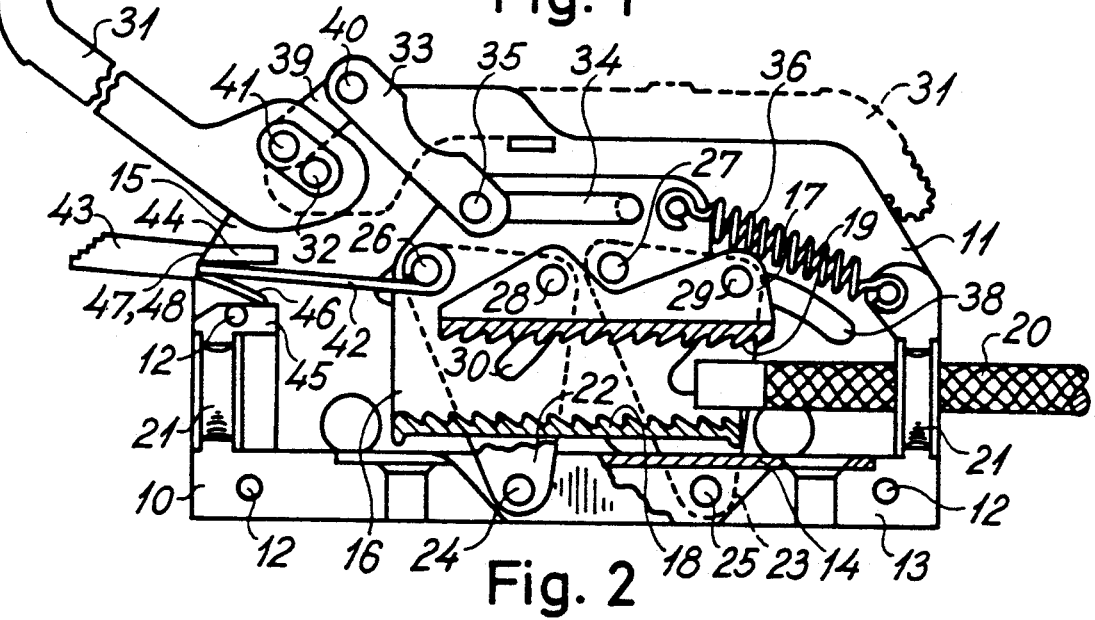
FIG. 2 is the gripping device shown in FIG. 2 in its rope releasing position, an end part of a rope being inserted into the gripping device.
Figure 3:
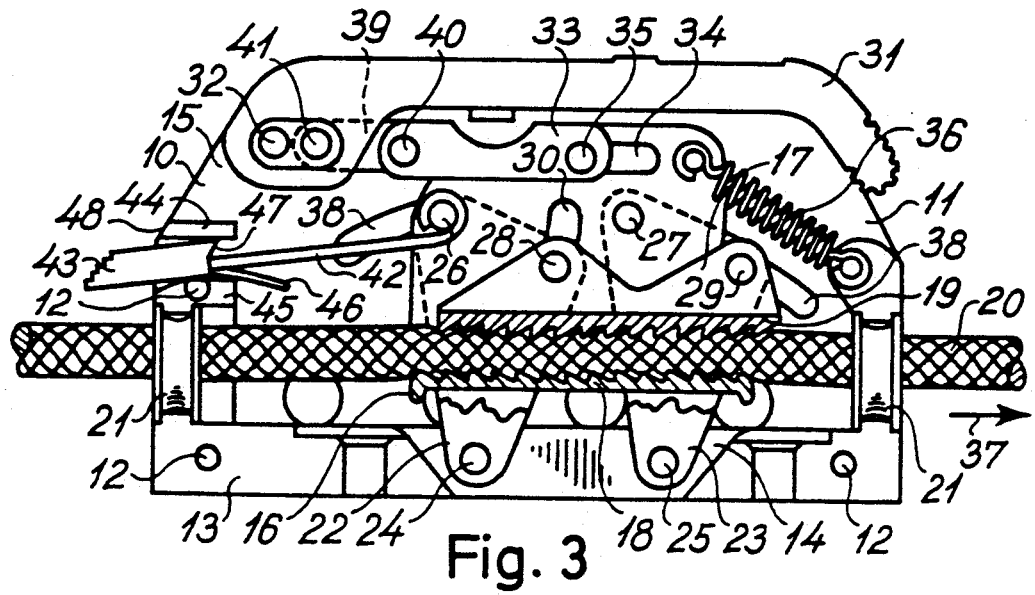
FIG. 3 shows the same as FIGS. 1 and 2, but with the gripping device in its locking position with a rope being gripped thereby.

When a free end of a rope or wire 20 is to be inserted through the rope passageway defined by the guide rings 21 and the oppositely arranged, spaced, rope engaging surfaces 18 and 19, as shown in FIG. 2, the operating handle 31 is swung from its inoperative position shown in FIGS. 1 and 3 to its operative position shown with solid lines in FIG. 2. In its inoperative position the operating handle 31 is located substantially within the outer contour of the side walls 15, while the operating handle extends upwardly from the frame 10 in its active position. When the operating handle 31 is moved from its inactive towards its active position the stud or pin 35 on the rod-shaped connecting link 33 is moved into engagement with the left hand ends of the slots or cut-outs 34, and the U-shaped rope engaging member 16 is thereby drawn to the left as viewed in the drawings. Because the rope engaging member or jaw member 16 is connected to the jaw member 17 and to the swinging links or arms 22 and 23 these parts are also moved towards the left. As described further below, the mutual spacing between the rope engaging surfaces 18 and 19 is thereby increased. During the first part of the movement of the operating handle 31 the connecting link 33 and the arm 39 define therebetween an angle which is only slightly smaller than 180°. This means, that the ratio between the movement of the operating handle 31 and the movement of the rope engaging members or jaw members 16 and 17 is relatively big. Therefore, the rope engaging surfaces 18 and 19 may without any difficulties be drawn out of engagement with the rope 20 during the first part of the movement of the operating handle 31. During the continued movement of the operating handle 31 the angle defined between the arm 39 and the connecting link 33 will decrease, and finally an edge surface of the arm 39 is brought into abutting engagement with the pivot pin 32 so that the arm 39 cannot be rotated further in relation to the operating handle 31 and retains a position in which it extends from the operating handle so as to define a substantially right angle therewith. This means that the ratio of movement between the movement of the operating handle 31 and the movement of the rope engaging members 16 and 17 is substantially decreased so that the rope engaging surfaces 18 and 19 are moved quickly away from each other during the last part of the movement of the operating handle 31. When the operating handle 31 is moved towards its active position, the retaining member 42 is moved outwardly, and at last the abutment surface 47 of the actuating member 43 may snap into engagement with the inclined surface 48 on the upper wall part 44 as previously explained. Because of the lost motion connection 34, 35, the operating handle 31 may now be moved back to its inactive position shown in FIG. 3, while the retaining member 42 is retaining the rope engaging member 16 and 17 in their rope releasing position.

The wire, cord, or rope 20 may now be passed through the gripping device and may be freely moved in both directions of the rope passageway without any problems. When it is desired to activate the gripping device for locking the rope against movement in one direction this may be done by depressing the activating member 43 by a thumb so as to bring the surfaces 47 and 48 out of mutual engagement. A tension spring 36 having its opposite ends connected to the rope engaging member 16 and the frame 10, respectively, then moves the rope engaging members 16 and 17 towards their rope engaging surface shown in FIG. 3. By pressing the actuating member 43 inwardly the operator of the gripping device may make sure that the rope engaging surfaces 18 and 19 are brought into a forceful engagement with the rope 20 as shown in FIG. 3. When a pulling or traction force is applied to the rope 20 in a direction indicated by an arrow 37 the friction between the rope and the engagement surfaces 18 and 19 causes that the engaging members or jaw members 16 and 17 are pulled in the same direction, whereby the swinging arms 22 and 23 are influenced to swing clockwise. As explained in U.S. Pat. No. 4,668,582, this causes that the substantially parallel rope engaging surfaces 18 and 19 are pressed even more forcefully towards each other so as to pinch the rope therebetween.

It should be understood that the gripping device according to the invention is not necessarily of the type described above, wherein both of the rope engaging members are moveable in relation to the frame of the gripping device. The gripping device may, alternatively, be of the type in which one of the rope engaging surfaces is stationary in relation to the frame, while the other rope engaging surface, which is defined by a moveable rope engaging member, may be moved towards and away from the stationary or fixed rope engaging surface. The important feature of the present invention is that the moveable rope engaging member or members may be releasably retained in a rope releasing position by means of a releasable retaining or locking member which may be formed in any suitable manner, whereby the operating handle may be moved to its inactive position while the rope releasing position of the rope engaging member or members is maintained.

I claim:

1. A gripping device for releasably gripping a rope-like member, said device comprising:

a frame, a pair of spaced rope engaging members having a pair of oppositely arranged, generally parallel extending rope engaging surfaces defining therebetween a passageway for the rope-like member and being mounted in said frame so as to be moveable in relation to each other such that a force applied to said rope engaging surfaces and acting in one direction of said rope passageway will tend to move the rope engaging members closer to each other towards a locking position of the engaging members, while a force applied to the rope engaging surfaces and acting in the opposite direction of the rope passageway will tend to increase the spacing of the rope engaging surfaces and to move the rope engaging members towards a releasing position, an operating handle mounted in the frame so as to be swingable between inactive and active positions, lost motion connecting means interconnecting the operating handle and at least one of the rope engaging members such that the rope engaging members are moved to their releasing position when the operating handle is moved from its inactive to its active position, and releasable retaining means connected to said at least one engaging member for retaining said engaging member in its releasing position in relation to the frame independent of the later position of the operating handle by activation in the active position of the operating handle.

2. A gripping device according to claim 1, wherein the retaining means defines an abutment surface, which in the releasing position of the rope engaging members is moved into and out of engagement of a retaining surface defined in the frame.

3. A gripping device according to claim 2, wherein the locking means is swingably mounted such that the abutment surface may be moved to a position opposite to the retaining surface when the rope engaging members are in their releasing position.

4. A gripping device according to claim 3, further comprising spring means for biasing the retaining means along the retaining surface to a retaining position.

5. A gripping device according to claim 1, wherein said at least one of said rope engaging members is moveably mounted in the frame by means of swingable arms to which said rope engaging member is pivotally connected by means of transversely extending pins or pivots, the retaining means being connected to one of these pivots.

6. A gripping device according to claim 5, wherein the retaining means is a U-shaped wire member having a free end being provided with an actuating member.

7. A gripping device according to claim 1, wherein the operating handle is connected to at least one of said rope engaging members by means of a link connection formed so as to decrease the ratio of movement between the swinging movement of the operating handle and the movement of the engaging member when the handle is moved towards its active position.

8. A gripping device according to claim 7, wherein said link connection comprises a link connected to the operating handle at a position spaced from the pivot axis of the operating handle, the gripping device further comprising a stop member for preventing said connecting link from swingably moving in relating to the operating handle during the last part of the movement of the operating handle towards its active position.

9. A gripping device according to claim 8, wherein the stop member defines an abutment surface formed on the operating handle for engaging with the connecting link.

10. A gripping device according to claim 8, wherein the stop member is a pivot pin for swingably mounting the operating handle.

* * * * *